G. B. Markham,
Bed Spring
No. 68,220.      Patented Aug. 27, 1867
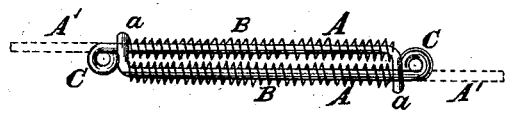
Witnesses.
J. A. Service.
Wm Trevin
Inventor:
Geo. B. Markham
Per Munn & Co
Attorney.

United States Patent Office.

GEORGE B. MARKHAM, OF PLYMOUTH, MICHIGAN.

Letters Patent No. 68,220, dated August 27, 1867.

IMPROVED BED-SPRING.

The Schedule referred to in these Letters Patent and making part of the same.

TO ALL WHOM IT MAY CONCERN:

Be it known that I, GEORGE B. MARKHAM, of Plymouth, in the county of Wayne, and State of Michigan, have invented a new and improved Bed-Spring; and I do hereby declare that the following is a full, clear, and exact description thereof, which will enable those skilled in the art to make and use the same, reference being had to the accompanying drawings, forming part of this specification.

This invention relates to an improved bed-spring, and consists of two metal wires having one end of each formed into a loop or eye. Each wire is then passed through a spiral spring, and the straight end of each passed through the loop in the other. The straight end is then curved round into an eye to receive the hook attached to the slats.

The accompanying drawing is a top view of my improved bed-spring.

Similar letters of reference indicate corresponding parts.

A A are two wires, having one end of each formed into a loop or eye, $a$. Each wire is then run into the spiral B, and the straight end of each wire, shown in red ink at $A'$ $A'$, run through the eye of the other wire. This straight end is then coiled round into an eye, C, to secure to the hook of the slats.

I claim as new, and desire to secure by Letters Patent—

The spring composed of two wires A A, having springs B coiled upon their length, each passing through an eye, $a$, in the other, and finished off by the loop or eye C, in manner and for the purpose substantially as above set forth and described.

GEORGE B. MARKHAM.

Witnesses:
JOHN GEMSALLY,
WM. F. MARKHAM.